(12) United States Patent
Kawai et al.

(10) Patent No.: US 10,106,109 B2
(45) Date of Patent: Oct. 23, 2018

(54) CHARGING INLET CONNECTOR ASSEMBLED TO A VEHICLE BODY OF A VEHICLE MOUNTED WITH A BATTERY

(71) Applicant: Yazaki Corporation, Tokyo (JP)

(72) Inventors: Ryuji Kawai, Kakegawa (JP);
Tomokazu Iwami, Kakegawa (JP);
Michitake Masuda, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/672,391

(22) Filed: Aug. 9, 2017

(65) Prior Publication Data
US 2018/0043848 A1    Feb. 15, 2018

(30) Foreign Application Priority Data
Aug. 10, 2016  (JP) .................................. 2016-158045

(51) Int. Cl.
*H01R 13/40* (2006.01)
*B60R 16/03* (2006.01)
(Continued)

(52) U.S. Cl.
CPC .............. *B60R 16/03* (2013.01); *B60L 11/18* (2013.01); *B60L 11/1818* (2013.01);
(Continued)

(58) Field of Classification Search
CPC .................... H01R 13/5202; H01R 13/5205
(Continued)

(56) References Cited

U.S. PATENT DOCUMENTS 2,502,860 A * 4/1950 Leithiser, Jr. ...... H01R 13/5045
264/248
4,477,022 A * 10/1984 Shuey .................. H01R 13/422
439/314
(Continued)

FOREIGN PATENT DOCUMENTS

| JP | 2000-215943 A | 8/2000 |
| JP | 2014-82005 A | 5/2014 |
| JP | 5660413 B2 | 1/2015 |

OTHER PUBLICATIONS

Communication dated Aug. 7, 2018, issued by the Japanese Patent Office in counterpart Japanese Patent Application No. 2016-158045.

*Primary Examiner* — Phuong Dinh
(74) *Attorney, Agent, or Firm* — Sughrue Mion, PLLC (57) ABSTRACT

A connector includes a housing configured to be supported by an attachment object and a terminal configured to be supported by the housing, and the terminal is configured to be electrically connected to a counterpart terminal of a counterpart connector when the counterpart connector is fitted to the connector. The housing includes a body portion having an inner cylinder portion to which the terminal is assembled and to which a counterpart housing of the counterpart connector can be fitted and an attachment portion having an outer cylinder portion which is configured to be fixed to the attachment object and to which the inner cylinder portion is fitted. The body portion is assembled to the attachment portion in a state that the inner cylinder portion fitted to the outer cylinder portion penetrates the outer cylinder portion.

10 Claims, 7 Drawing Sheets

(51) Int. Cl.
  *B60L 11/18* (2006.01)
  *H01R 13/447* (2006.01)
  *H01R 13/74* (2006.01)
  *H01R 13/506* (2006.01)
  *H01R 13/512* (2006.01)
  *H01R 13/52* (2006.01)
  *H01R 13/629* (2006.01)

(52) U.S. Cl.
  CPC ......... *H01R 13/447* (2013.01); *H01R 13/506* (2013.01); *H01R 13/748* (2013.01); *H01R 13/512* (2013.01); *H01R 13/5202* (2013.01); *H01R 13/62955* (2013.01); *H01R 2201/26* (2013.01)

(58) Field of Classification Search
  USPC ................................................... 439/589, 34
  See application file for complete search history.

(56) References Cited

U.S. PATENT DOCUMENTS

| | | | |
|---|---|---|---|
| 9,199,589 B2* | 12/2015 | Osawa | ................... B60L 11/18 |
| 2013/0130525 A1* | 5/2013 | Hachadorian | ...... H01R 13/5213 439/142 |
| 2014/0315426 A1 | 10/2014 | Osawa | |
| 2015/0258905 A1 | 9/2015 | Fukushima et al. | |

* cited by examiner

CHARGING INLET CONNECTOR ASSEMBLED TO A VEHICLE BODY OF A VEHICLE MOUNTED WITH A BATTERY

CROSS REFERENCE TO RELATED APPLICATIONS

This application is based on Japanese Patent Application (No. 2016-158045) filed on Aug. 10, 2016, the contents of which are incorporated herein by reference.

BACKGROUND OF THE INVENTION

1. Field of the Invention

The present invention relates to a connector which can be fitted to a counterpart connector.

2. Description of the Related Art

When a feeding connector which serves as a counterpart connector is fitted into a charging connector assembled to a body of a vehicle, a battery mounted in the vehicle such as an electric vehicle or a plug-in hybrid electric vehicle is charged.

Figure 7:
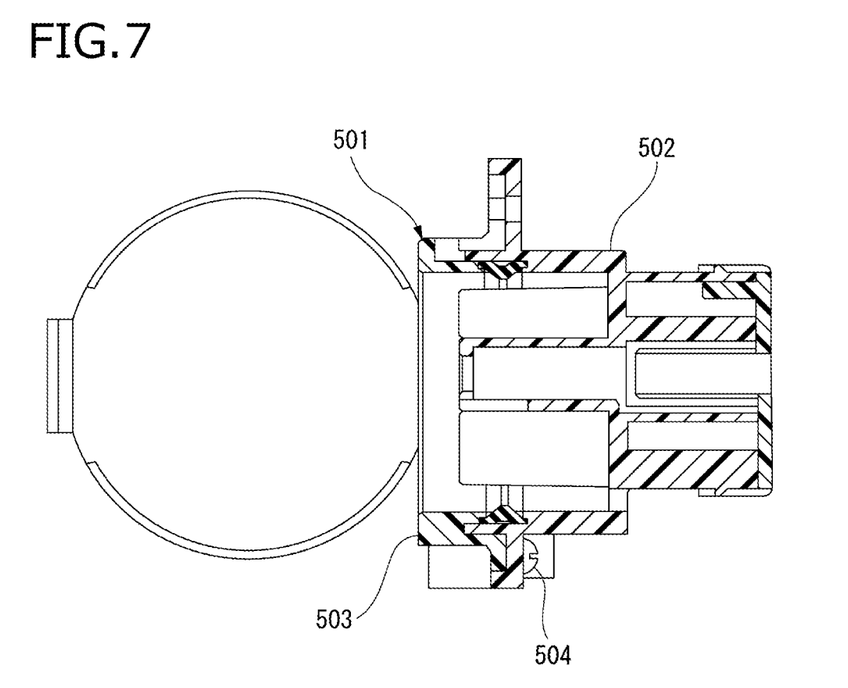
FIG. 7 is a vertically sectional view of a background-art connector.

As shown in FIG. 7, there has been known a vehicle side connector in which a housing 501 mounted in a panel constituting a body of a vehicle includes two members, i.e. a connector body portion 502 to which a counterpart connector is fitted, and an attachment portion 503 which is fixed to the panel. The connector body portion 502 is assembled to the attachment portion 503 by a plurality of tapping screws 504. In this manner, the connector body portion 502 can be prevented from coming off the attachment portion 503 when the counterpart connector is inserted/removed into/from the vehicle side connector (e.g. see JP-B-5660413).

The aforementioned vehicle side connector has a structure in which the connector body portion 502 is assembled and united to the attachment portion 503 by the tapping screws 504. Accordingly, the number of components is large and assembling work is complicated.

SUMMARY OF THE INVENTION

The invention has been accomplished in consideration of the aforementioned circumstances. An object of the invention is to provide a connector in which the number of components can be reduced and assembling workability can be improved.

In order to achieve the aforementioned object, the connector according to the invention is characterized by the following configurations (1) to (5).

(1) A connector including:
   a housing configured to be supported by an attachment object; and
   a terminal configured to be supported by the housing, and the terminal is configured to be electrically connected to a counterpart terminal of a counterpart connector when the counterpart connector is fitted to the connector,
   wherein the housing comprises:
      a body portion having an inner cylinder portion to which the terminal is assembled and to which a counterpart housing of the counterpart connector can be fitted; and
      an attachment portion having an outer cylinder portion which is configured to be fixed to the attachment object and to which the inner cylinder portion is fitted; and
      wherein the body portion is assembled to the attachment portion in a state that the inner cylinder portion fitted to the outer cylinder portion penetrates the outer cylinder portion.

(2) The connector according to the aforementioned configuration (1), wherein each of the outer cylinder portion and the inner cylinder portion is formed into a circular cylinder shape; and
   wherein a recess and a protrusion are provided on an inner circumferential face of the outer cylinder portion and an outer circumferential face of the inner cylinder portion so that the recess and the protrusion are engaged with each other to thereby regulate circumferential movement between the outer cylinder portion and the inner cylinder portion.

(3) The connector according to the aforementioned configuration (1) or (2), wherein a cap for opening or closing an opening portion of the inner cylinder portion is supported swingably on an edge portion of the outer cylinder portion; and
   wherein a packing of the cap is brought into tight contact with whole circumference of a front end face of the inner cylinder portion in a state that the opening portion of the inner cylinder portion is closed by the cap.

(4) The connector according to any of the aforementioned configurations (1) to (3), wherein the housing is supported by the attachment object serving a vehicle body panel (P) of a vehicle, so that a power source mounted in the vehicle can be charged when a feeding connector as the counterpart connector is fitted to the connector.

(5) The connector according to any of the aforementioned configurations (1) to (4), wherein a lock protrusion and a lock portion are provided on the body portion and the attachment portion; and
   wherein the lock protrusion is locked in the lock portion to thereby assemble the body portion to the attachment portion.

In the connector having the aforementioned configuration (1), the body portion is assembled to the attachment portion in the state in which the inner cylinder portion fitted to the outer cylinder portion penetrates the outer cylinder portion. Therefore, substantially the whole of an inner circumferential face of the outer cylinder portion of the attachment portion can touch an outer circumferential face of the inner cylinder portion of the body portion in a tight contact state.

Thus, a simple fixation structure in which, for example, a lock protrusion is locked in a lock portion to thereby assemble the body portion to the attachment portion can be used for fixation without using any fastening member such as any screw. Thus, the number of components of the housing can be reduced, and assembling workability can be improved.

In addition, even when the counterpart connector inserted/removed into/from the inner cylinder portion of the body portion pries or twists the body portion to thereby impose excessive external force on the body portion, the external force can be received and stopped by the attachment portion which is fixed to the attachment object. Accordingly, the housing can be formed to have a robust structure against the insertion/removal of the counterpart connector.

In the connector having the aforementioned configuration (2), the recess and the protrusion provided in the inner circumferential face of the outer cylinder portion and the outer circumferential face of the inner cylinder portion are engaged with each other. Accordingly, the body portion can be positioned and assembled to the attachment portion easily. Moreover, circumferential movement between the body portion and the attachment portion can be regulated. Therefore, a more robust structure against the twisting caused by the counterpart connector can be formed.

In the connector having the aforementioned configuration (3), the inner cylinder portion is arranged to penetrate the outer cylinder. Thus, the front end face of the inner cylinder portion is flush with or protruded from a front end face of the outer cylinder portion. Accordingly, when the inner cylinder portion is closed by the cap, the packing of the cap can be surely brought into tight contact with the front end face of the inner cylinder portion along the whole circumference. Thus, the inner cylinder portion can be surely closed by the cap so that waterproof and dustproof properties can be enhanced.

In the connector having the aforementioned configuration (4), the housing can be easily assembled to the vehicle body panel of the vehicle. The vehicle body panel is the attachment object. Moreover, even when a user inserts/removes the feeding connector to pry or twist the body portion to thereby impose excessive external force on the body portion, the external force can be received and stopped by the attachment portion which is fixed to the vehicle body panel of the vehicle.

According to the invention, it is possible to provide a connector in which the number of components can be reduced and assembling workability can be improved.

The invention has been described above briefly. When an undermentioned mode (hereinafter referred to as "embodiment") for carrying out the invention is further read through with reference to the accompanying drawings, details of the invention can be made clearer.

DETAILED DESCRIPTION OF THE EXEMPLARY EMBODIMENTS

An embodiment of the invention will be described below by way of example with reference to the drawings.

Figure 1:
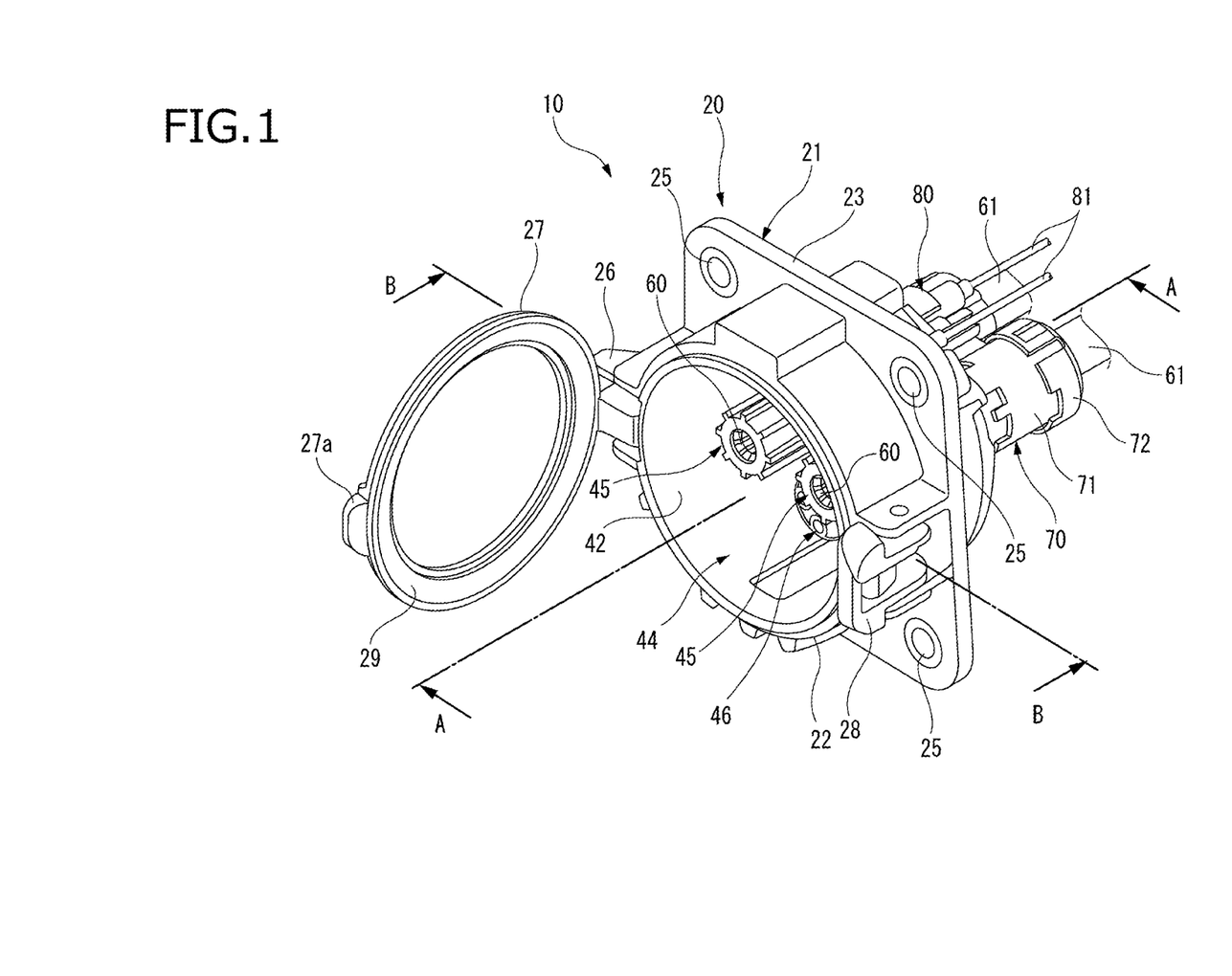
FIG. 1 is a perspective view of a connector according to an embodiment of the invention.
Figure 2:
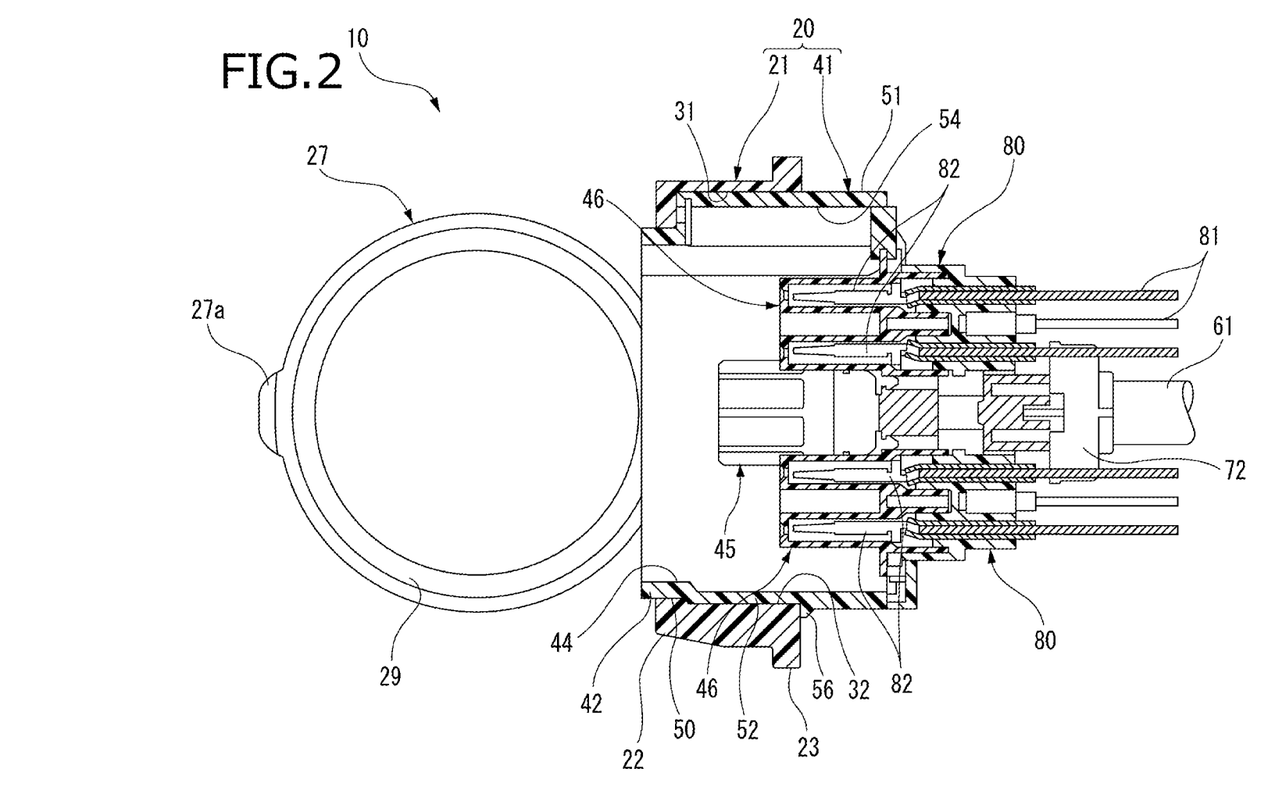
FIG. 2 is a sectional view taken along a line A-A in FIG. 1.
Figure 3:
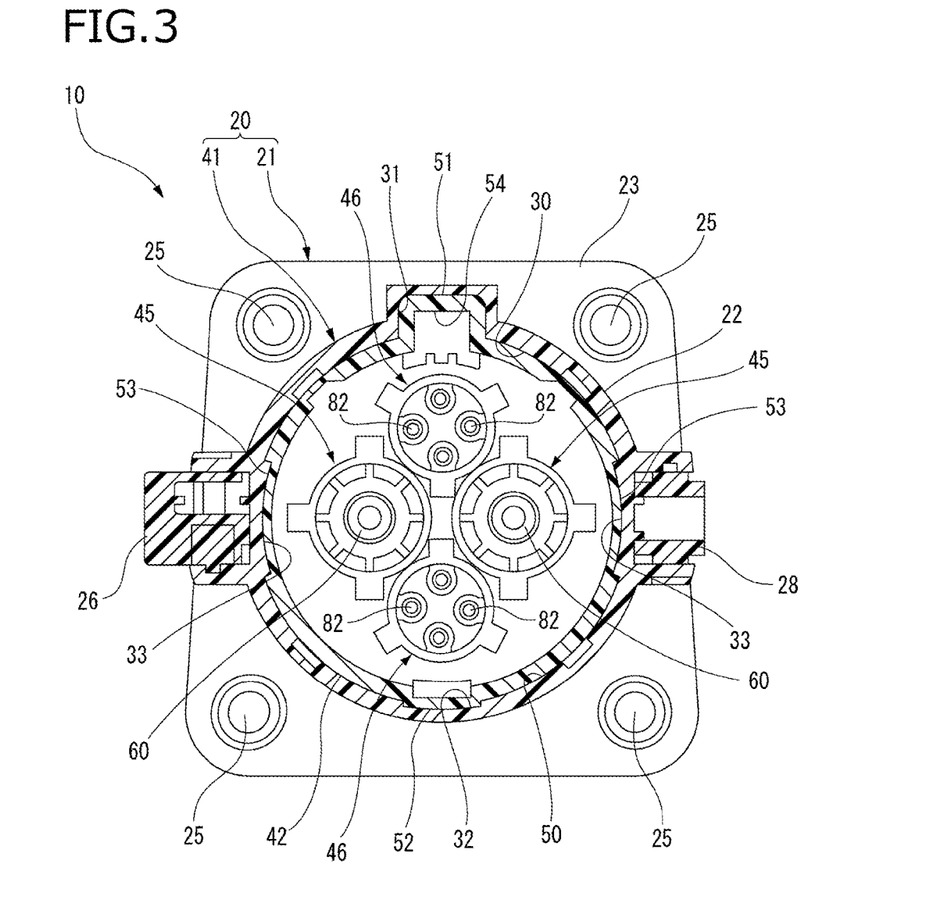
FIG. 3 is a sectional view taken along a line B-B in FIG. 1.
Figure 4:
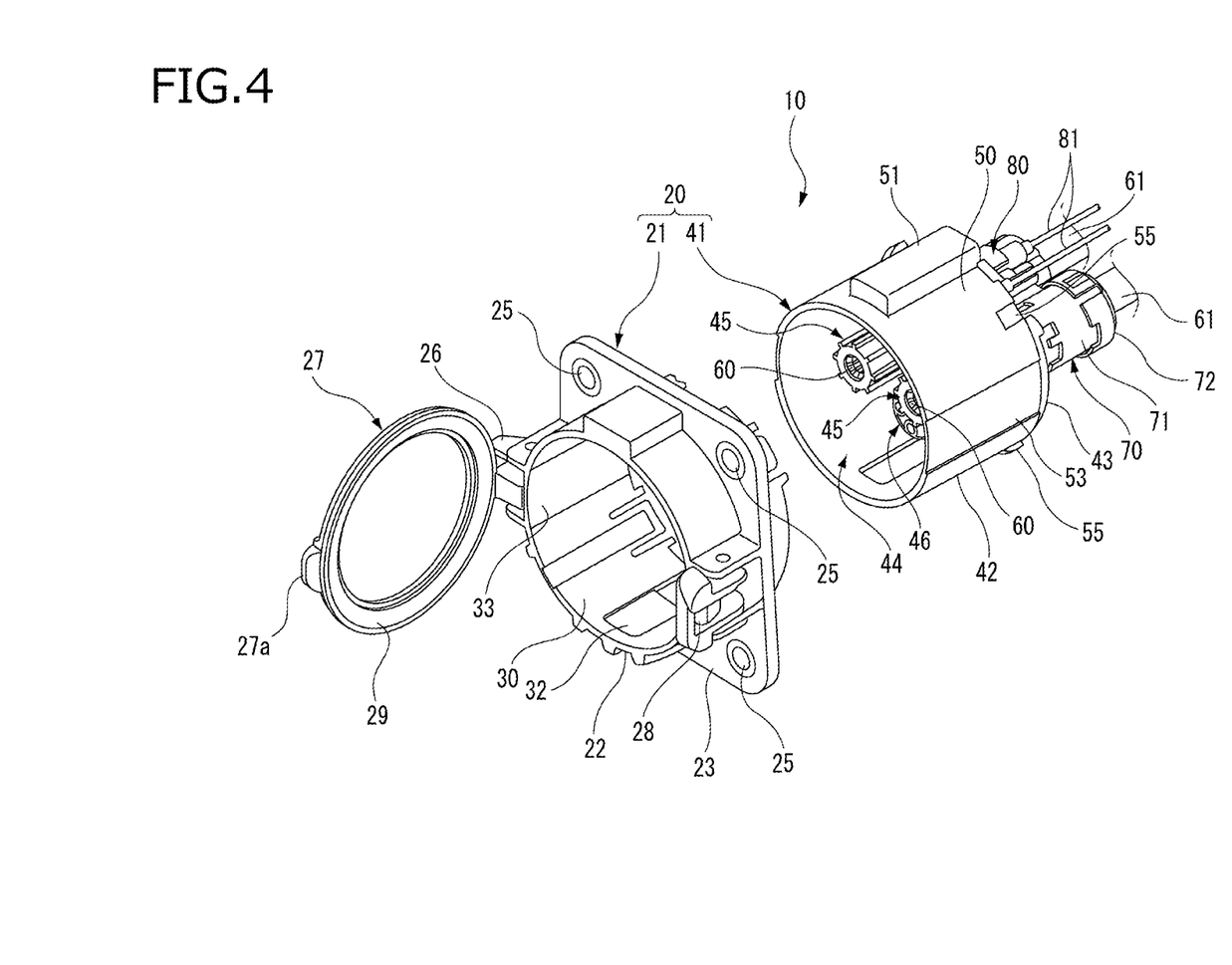
FIG. 4 is a perspective view of the connector in which a vehicle body attachment portion and a connector body portion of a housing have been separated from each other.
Figure 5:
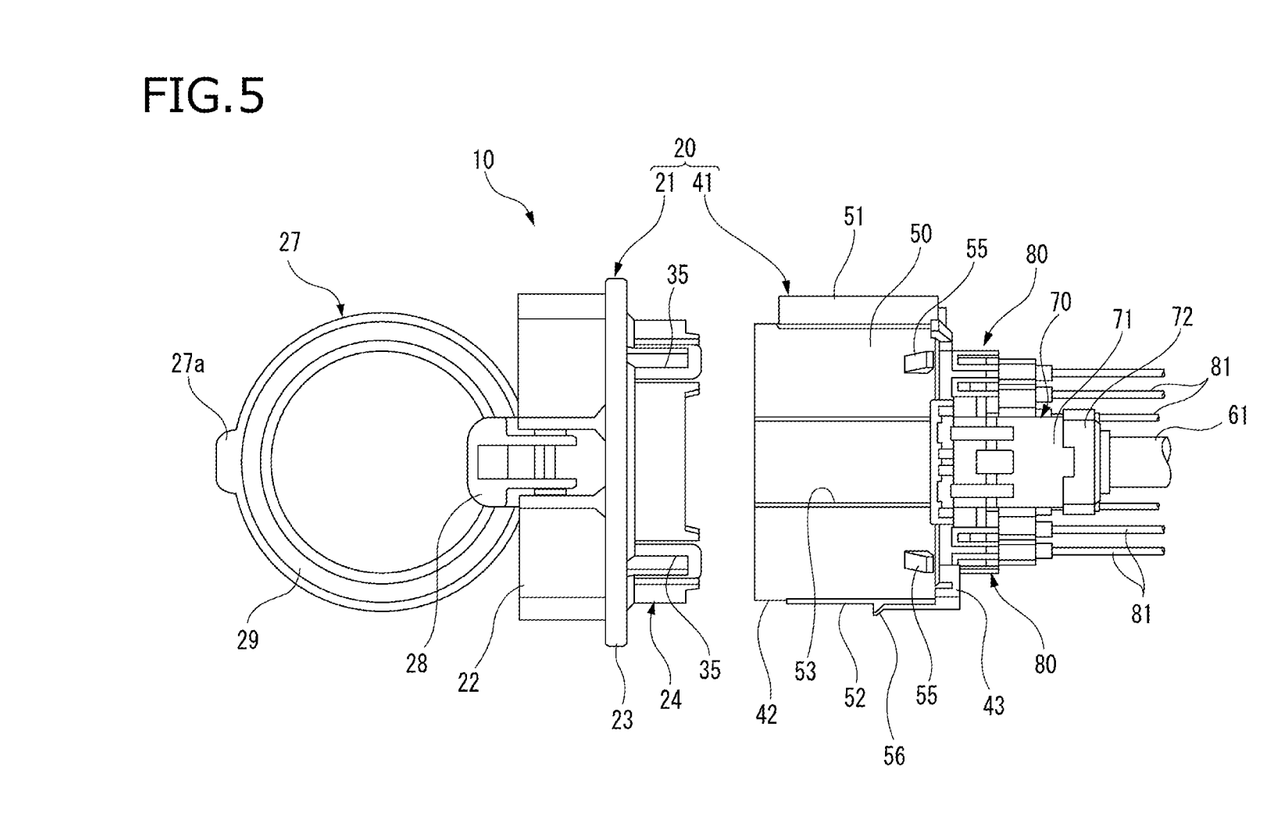
FIG. 5 is a side view of the connector shown in FIG. 4.

FIG. 1 is a perspective view of a connector according to an embodiment of the invention. FIG. 2 is a sectional view taken along a line A-A in FIG. 1. FIG. 3 is a sectional view taken along a line B-B in FIG. 1. FIG. 4 is a perspective view of the connector in which a vehicle body attachment portion and a connector body portion of a housing have been separated from each other. FIG. 5 is a side view of the connector shown in FIG. 4.

As shown in FIGS. 1 to 3, the connector 10 according to the embodiment is provided with a housing 20, charging terminals 60, a terminal holder 70, and rear holders 80.

The connector 10 is a charging inlet connector assembled to a vehicle body of a vehicle mounted with a battery, such as an electric vehicle (EV) or a plug-in hybrid electric vehicle (PHEV). When the battery of the vehicle is charged, a feeding connector on a feeding device (not shown) side is fitted into the connector 10. In a state in which the feeding connector is fitted to the connector 10, electric power is fed from the feeding device toward the vehicle side so that the battery can be charged.

As shown in FIGS. 4 and 5, the housing 20 has a vehicle body attachment portion (attachment portion) 21 and a connector body portion (body portion) 41. Each of the vehicle body attachment portion 21 and the connector body portion 41 is formed out of an insulating synthetic resin.

The vehicle body attachment portion 21 has an outer cylinder portion 22, a fixation flange 23, and a lock portion 24. The outer cylinder portion 22 is formed into a circular cylinder. The fixation flange 23 is formed on a rear end side of the outer cylinder portion 22. A plurality of insertion holes 25 are formed in the fixation flange 23. The lock portion 24 is extended on the rear end side behind the fixation flange 23. The vehicle body attachment portion 21 is fitted from the lock portion 24 side into an attachment hole H formed in a vehicle body panel P constituting the body of the vehicle (see FIGS. 6A to 6C). Bolts are inserted through the insertion holes 25 of the fixation flange 23 in the vehicle body attachment portion 21 and screwed into threaded holes 91 of the vehicle body panel P. Thus, the housing 20 is fastened and fixed to the vehicle body panel P.

In the vehicle body attachment portion 21, a cap 27 is coupled to a front end-side edge portion of the outer cylinder portion 22 by a hinge portion 26. The cap 27 is swung on the hinge portion 26. A lock mechanism 28 for locking a lock pawl 27a formed at an edge portion of the cap 27 is provided in an opposite position to the hinge portion 26 in the front end-side edge portion of the outer cylinder portion 22. Therefore, the lock pawl 27a of the cap 27 is locked by the lock mechanism 28. In addition, the cap 27 has a packing 29 provided circumferentially along an edge portion on an inner face side of the cap 27. The packing 29 is formed out of an elastic resin material such as rubber or silicone rubber.

As shown in FIG. 3, engagement recesses 31 and 32 are formed in an inner circumferential face 30 of the outer cylinder portion 22. The engagement recesses 31 and 32 are provided in upper and lower positions of the outer cylinder portion 22 so as to extend axially. In addition, two engagement protrusions 33 are formed in the inner circumferential face 30 of the outer cylinder portion 22. The engagement protrusions 33 are provided in left and right positions of the outer cylinder portion 22 so as to extend axially.

The lock portion 24 is formed continuously from the outer cylinder portion 22, passes over the fixation flange 23, and is then extended rearward. Four lock holes 35 are formed in the lock portion 24. The lock holes 35 are formed at intervals circumferentially.

The connector body portion 41 is formed into a bottomed cylinder having an inner cylinder portion 42 and a bottom plate portion 43. The inner cylinder portion 42 is formed into a circular cylinder. The bottom plate portion 43 is formed on a rear end side of the inner cylinder portion 42. The connector body portion 41 has a fitting recess 44 open on a front end side. A housing of the feeding connector which is a counterpart connector is fitted into the fitting recess 44.

A pair of terminal housing cylinder portions 45 protruding inside the fitting recess 44 are formed in the bottom plate portion 43 of the connector body portion 41. In addition, a pair of terminal housing portions 46 are formed in upper and lower positions between the terminal housing cylinder portions 45 in the bottom plate portion 43 of the connector body portion 41. The inner cylinder portion 42 of the connector body portion 41 has an outer diameter slightly smaller than an inner diameter of the outer cylinder portion 22 of the vehicle body attachment portion 21. The outer cylinder portion 42 is fitted into the outer cylinder portion 22 from a rear side of the outer cylinder portion 22.

Engagement protrusions 51 and 52 are formed in an outer circumferential face 50 of the inner cylinder portion 42. The engagement protrusions 51 and 52 are provided in upper and lower positions of the inner cylinder portion 42 so as to extend axially. In addition, two engagement recesses 53 are formed in the outer circumferential face 50 of the inner cylinder portion 42. The engagement recesses 53 are provided in left and right positions of the inner cylinder portion 42 so as to extend axially.

The inner cylinder portion 42 of the connector body portion 41 is fitted into the outer cylinder portion 22 from the rear side of the outer cylinder portion 22 while the engagement protrusions 51 and 52 and the engagement recesses 53 of the inner cylinder portion 42 of the connector body portion 41 are fitted into the engagement recesses 31 and 32 and the engagement protrusions 33 of the outer cylinder portion 22 of the vehicle body attachment portion 21 respectively. Thus, the connector body portion 41 is assembled to the vehicle body attachment portion 21.

Incidentally, an inner circumferential side in the engagement recess 51 is used as a latch recess 54. A latch mechanism of the feeding connector is engaged with the latch recess 54. Thus, the feeding connector can be prevented from being coming off the connector body portion 41 during charging.

In addition, four lock protrusions 55 protruding radially outward are formed in a rear end of the inner cylinder portion 42. The lock protrusions 55 are formed at intervals circumferentially. When the inner cylinder portion 42 of the connector body portion 41 is pushed and fitted into the outer cylinder portion 22 of the vehicle body attachment portion 21, the lock protrusions 55 enter the lock holes 35 in the lock portion 24 of the vehicle body attachment portion 21 so as to be locked therein. Thus, the inner cylinder portion 42 is fitted to the outer cylinder portion 22 so that the connector body portion 41 is maintained in an assembled state to the vehicle body attachment portion 21.

An axial length of the inner cylinder portion 42 of the connector body portion 41 is made longer than that of the outer cylinder portion 22 of the vehicle body attachment portion 21. Thus, when the inner cylinder portion 42 is fitted into the outer cylinder portion 22 from the rear side thereof, the inner cylinder portion 42 penetrates the outer cylinder portion 22. The position of a front end face of the inner cylinder portion 42 which has penetrated the outer cylinder portion 22 is flush with a front end face of the outer cylinder portion 22 or protruded frontward from the front end face of the outer cylinder portion 22. Thus, the packing 29 of the cap 27 is brought into tight contact with the front end face of the inner cylinder portion 42 of the connector body portion 41 along the whole circumference when the cap 27 is closed.

In addition, a positioning protrusion 56 protruding radially outward from the outer circumferential face 50 is formed in a lower portion of the inner cylinder portion 42. When the inner cylinder portion 42 is fitted into the outer cylinder portion 22, the positioning protrusion 56 abuts against the fixation flange 23 of the vehicle body attachment portion 21. Thus, the connector body portion 41 is positioned relatively to the vehicle body attachment portion 21 in a state in which the position of the front end face of the inner cylinder portion 42 is flush with the front end face of the outer cylinder portion 22 or protruded frontward from the front end face of the outer cylinder portion 22.

The charging terminals 60 are charging terminals through which a charging current is made to flow. For example, the charging terminals 60 are formed out of an electrically conductive metal material such as copper or a copper alloy etc. The charging terminals 60 are fitted into the terminal housing cylinder portions 45 from a rear side of the connector body portion 41 and housed in parallel in the housing 20 in a horizontal plane.

Charging terminals of the feeding connector which is the counterpart connector are fitted to the charging terminals 60 on the front end side. Thus, the charging terminals 60 are electrically connected to the charging terminals of the fitted feeding connector.

Power cables 61 are electrically connected to the charging terminals 60 on the rear end side exposed on the rear side of the connector body portion 41. The power cables 61 are electric cables connected to the battery of the vehicle. A large current is made to flow through the power cables 61.

The terminal holder 70 is formed out of an insulating synthetic resin. The terminal holder 70 has a pair of holder portions 71 which are formed into cylinders covering connection places between the charging terminals 60 and the power cables 61. The power cables 61 are led out of the holder portions 71 respectively. Rubber stoppers (not shown) and rubber stopper holding fixtures 72 are mounted in advance on the power cables 61 led out of the holder portions 71. The rubber stoppers are fitted into the holder portions 71, and further, the rubber stopper holding fixtures 72 are fixed to end portions of the holder portions 71. Thus, the holder portions 71 from which the power cables 61 are led are made waterproof by the rubber stoppers. Incidentally, when waterproofness in the terminal holder 70 is unnecessary, the rubber stoppers fitted to the holder portions 71 can be removed.

The rear holders 80 are mounted in advance on signal lines 81. The signal lines 81 are electric cables which are connected to signal lines of the counterpart connector to transmit/receive signals and exchange communication between the feeding device and the vehicle. Signal terminals 82 are crimp-connected to end portions of the signal lines 81 (see FIG. 2). The signal terminals 82 of the signal lines 81 are inserted into the terminal housing portions 46 of the connector body portion 41. The rear holders 80 are put and mounted on the terminal housing portions 46 in which the signal terminals 82 have been inserted. Thus, the signal terminals 82 are held in the terminal housing portions 46 of the connector body portion 41, and the signal lines 81 are led rearward from the connector body portion 41. Signal terminals crimp-connected to end portions of the signal lines of the feeding connector which serves as the counterpart connector are connected to the signal terminals 82 held in the terminal housing portions 46 of the connector body portion 41. Thus, the signal lines 81 of the connector 10 and the signal lines of the counterpart connector are electrically conductively to each other respectively so that the transmission/reception of signals or the exchange of communication can be performed.

Next, a case where the connector 10 according to the embodiment is assembled to a panel of a vehicle will be described.

Figure 6A:
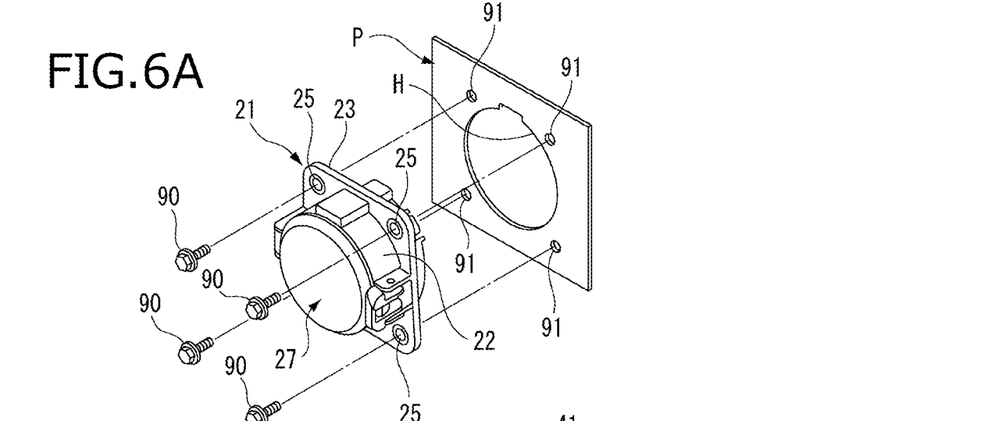
FIGS. 6A to 6C are perspective views for explaining work for assembling the connector to a vehicle body panel of a vehicle.
Figure 6B:
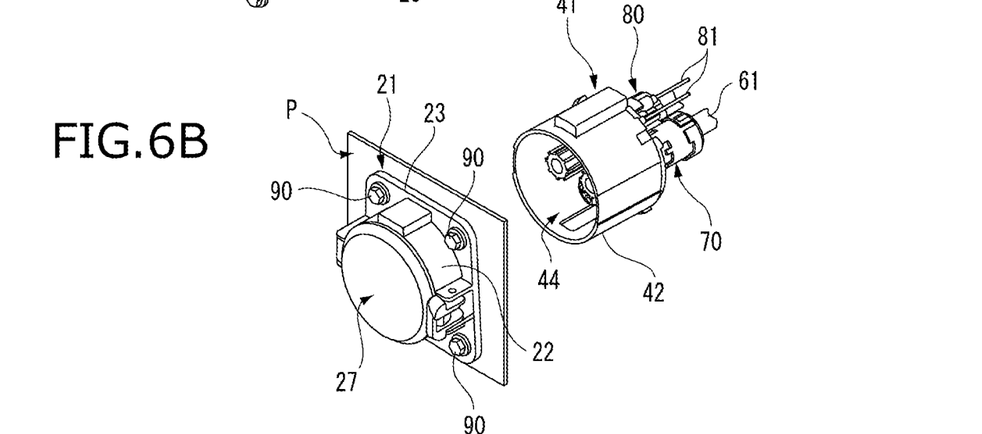
Figure 6C:
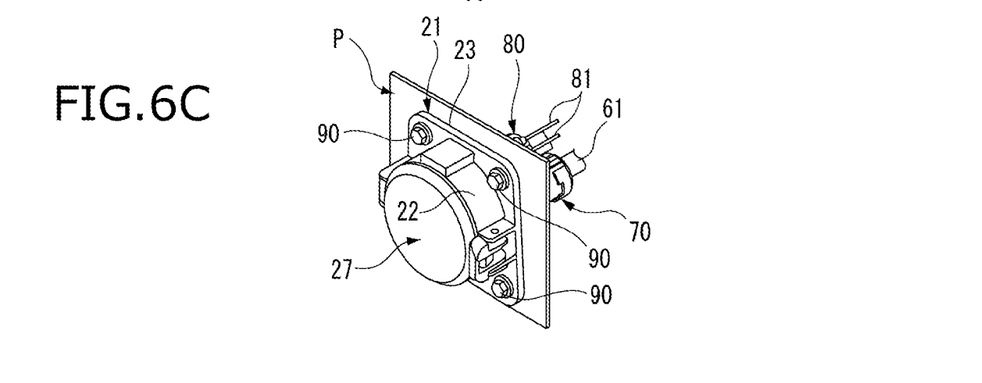

FIGS. 6A to 6C are perspective views for explaining work for assembling the connector to the vehicle body panel of the vehicle.

As shown in FIG. 6A, the vehicle body attachment portion 21 is fitted into an attachment hole H of the vehicle body panel (attachment object) P of the vehicle from outside the vehicle. Bolts 90 are inserted into the insertion holes 25 of the fixation flange 23 of the vehicle body attachment portion 21 and screwed into threaded holes 91 formed in the vehicle body panel P to thereby fasten the fixation flange 23 to the vehicle body panel P. Thus, the vehicle body attachment portion 21 is fixed to the vehicle body panel P.

As shown in FIG. 6B, the inner cylinder portion 42 of the connector body portion 41 is fitted from inside the vehicle into the outer cylinder portion 22 of the vehicle body attachment portion 21 fixed to the vehicle body panel P until the positioning protrusion 56 abuts against the fixation flange 23. On this occasion, the engagement protrusions 51 and 52 and the engagement recesses 53 of the connector body portion 41 are engaged with the engagement recesses 31 and 32 and the engagement protrusions 33 of the outer cylinder portion 22 of the vehicle body attachment portion 21 respectively. The lock protrusions 55 of the connector body portion 41 are locked in the lock holes 35 of the vehicle body attachment portion 21.

In this manner, the connector body portion 41 is assembled to the vehicle body attachment portion 21 fixed to the vehicle body panel P so that the housing 20 including the vehicle body attachment portion 21 and the connector body portion 41 is fixed to the vehicle body panel P, as shown in FIG. 6C.

Thus, in the connector 10, the housing 20 is divided into the vehicle body attachment portion 21 and the connector body portion 41. With the configuration, the vehicle body attachment portion 21 can be fixed to the vehicle body panel P of the vehicle, and then the connector body portion 41 can be assembled to the vehicle body attachment portion 21. Thus, the housing 20 can be supported by the body of the vehicle easily.

Here, the axial length of the inner cylinder portion 42 of the connector body portion 41 is longer than that of the outer cylinder portion 22 of the vehicle body attachment portion 21. When the inner cylinder portion 42 is fitted into the outer cylinder portion 22, the inner cylinder portion 42 penetrates the outer cylinder portion 22. Thus, substantially the whole of the inner circumferential face 30 of the outer cylinder portion 22 of the vehicle body attachment portion 21 touches the outer circumferential face 50 of the inner cylinder portion 42 of the connector body portion 41 in a tight contact state. In addition, the inner cylinder portion 42 which has penetrated the outer cylinder portion 22 is disposed in a state in which the position of the front end face of the inner cylinder portion 42 is flush with the front end face of the outer cylinder portion 22 or protruded frontward from the front end face of the outer cylinder portion 22.

According to the connector 10 according to the embodiment as described above, the connector body portion 41 is assembled to the vehicle body attachment portion 21 in a state in which the inner cylinder portion 42 fitted to the outer cylinder portion 22 penetrates the outer cylinder portion 22. Therefore, substantially the whole of the inner circumferential face 30 in the outer cylinder portion 22 of the vehicle body attachment portion 21 can touch the outer circumferential face 50 of the inner cylinder portion 42 of the connector body portion 41 in a tight contact state.

Thus, a simple fixation structure in which the lock protrusions 55 are locked in the lock holes 35 to thereby assemble the connector body portion 41 to the vehicle body attachment portion 21 is used for fixation without using any fastening materials such as any screws. Thus, the number of components of the housing 20 can be reduced, and assembling workability can be improved.

In addition, even when the counterpart connector inserted/removed into/from the inner cylinder portion 42 of the connector body portion 41 by a user pries or twists the connector body portion 41 to thereby impose excessive external force on the connector body portion 41, the external force can be received and stopped by the vehicle body attachment portion 21 fixed to the vehicle body panel P. Accordingly, the housing 20 can be formed with a robust structure against insertion/removal of the counterpart connector.

In addition, various vehicle body attachment portions 21 among which the fixation flange 23 fixed to the vehicle body panel P, the shape of the cap 27 etc. varies may be prepared while the connector body portion 41 is used as a common component. The configuration made in this manner can be easily adapted to specifications of vehicles etc.

In addition, according to the connector 10 according to the embodiment, the engagement recesses 31 and 32 and the engagement protrusions 33 of the inner circumferential face 30 of the outer cylinder portion 22 and the engagement protrusions 51 and 52 and the engagement recesses 53 of the outer circumferential face of the inner cylinder portion 42 are engaged with each other respectively. Thus, the connector body portion 41 can be positioned and assembled to the vehicle body attachment portion 21 easily. In addition, circumferential movement between the vehicle body attachment portion 21 and the connector body portion 41 can be regulated. Therefore, the structure can be made more robust against the twisting caused by the counterpart connector.

Further, according to the connector 10 according to the embodiment, the inner cylinder portion 42 is made to penetrate the outer cylinder portion 22. Thus, the front end face of the inner cylinder portion 42 is made flush with or protruded from the front end face of the outer cylinder portion 22. Accordingly, the packing 29 of the cap 27 can be surely brought into tight contact with the front end face of the inner cylinder portion 42 along the whole circumference when the inner cylinder portion 42 is closed by the cap 27. Thus, the inner cylinder portion 42 can be surely closed by the cap 27 so that waterproof and dustproof properties can be enhanced.

Incidentally, in the aforementioned embodiment, the bolts 90 inserted in the insertion holes 25 of the fixation flange 23 of the vehicle body attachment portion 21 are screwed into the threaded holes 91 of the vehicle body panel P. In this manner, the vehicle body attachment portion 21 is fixed to the vehicle body panel P. However, the structure for fixing the vehicle body attachment portion 21 to the vehicle body panel P is not limited to the one using the bolts 90. For example, the following structure may be used alternatively. That is, stud bolts erectly provided on the fixation flange 23 are inserted into hole portions formed in the vehicle body panel P and nuts are fastened to the stud bolts from the back side of the vehicle body panel P.

In addition, in the aforementioned embodiment, the vehicle body attachment portion 21 of the housing 20 is fitted into the attachment hole H of the vehicle body panel P from outside the vehicle so that the fixation flange 23 can be fixed to the vehicle body panel P. The connector according to the invention is not limited thereto. Since the attachment hole H having a shape corresponding to the external shape of the outer cylinder portion 22 of the vehicle body attachment portion 21 is formed in the vehicle body panel P, the vehicle body attachment portion 21 may be fitted into the attachment hole H from inside the vehicle alternatively so that the fixation flange 23 can be fixed to the vehicle body panel P.

Further, the case where the connector 10 is used as a charging inlet connector which can be assembled to a vehicle body of a vehicle mounted with a battery has been described in the aforementioned embodiment. However, the connector according to the invention is not limited thereto but may be used as a feeding outlet connector for feeding power from the battery of the vehicle to a device outside the vehicle.

Incidentally, the invention is not limited to the aforementioned embodiment. Modifications, improvements, etc. can be made suitably on the invention. Moreover, materials, shapes, dimensions, numbers, arrangement places, etc. of respective constituent elements in the aforementioned embodiment are not limited. Any materials, any shapes, any dimensions, any numbers, any arrangement places, etc. may be used as long as the invention can be attained.

Here, the aforementioned features of the connector according to the embodiment of the invention will be summarized and listed briefly in the following items [1] to [4] respectively.

[1] A connector (10) including: a housing (20) configured to be supported by an attachment object (vehicle body panel P); and a terminal (charging terminals 60, signal terminals 82) configured to be supported by the housing and the terminal is configured to be electrically connected to a counterpart terminal of a counterpart connector when the counterpart connector is fitted to the connector,
wherein the housing includes: a body portion (connector body portion 41) having an inner cylinder portion (42) to which the terminal is assembled and to which a counterpart housing of the counterpart connector can be fitted; and an attachment portion (vehicle body attachment portion 21) having an outer cylinder portion (22) which is configured to be fixed to the attachment object and to which the inner cylinder portion is fitted; and
wherein the body portion is assembled to the attachment portion in a state that the inner cylinder portion fitted to the outer cylinder portion penetrates the outer cylinder portion.

[2] The connector (10) according to the aforementioned item [1], wherein each of the outer cylinder portion and the inner cylinder portion is formed into a circular cylinder shape; and wherein a recess (engagement recesses 31, 32, 53) and a protrusion (engagement protrusions 33, 51, 52) are provided on an inner circumferential face (30) of the outer cylinder portion and an outer circumferential face (50) of the inner cylinder portion so that the recess and the protrusion can be engaged with each other respectively to thereby regulate circumferential movement between the outer cylinder portion and the inner cylinder portion.

[3] The connector (10) according to the aforementioned item [1] or [2], wherein a cap (27) for opening or closing an opening portion of the inner cylinder portion is supported swingably on an edge portion of the outer cylinder portion; and wherein a packing (29) of the cap is brought into tight contact with whole circumference of a front end face of the inner cylinder portion in a state that the opening portion of the inner cylinder portion is closed by the cap.

[4] The connector (10) according to any of the aforementioned configurations [1] to [3], wherein the housing is supported by the attachment object serving a vehicle body panel (P) of a vehicle, so that a power source mounted in the vehicle can be charged when a feeding connector as the counterpart connector is fitted into the connector.

[5] The connector (10) according to any of the aforementioned configurations [1] to [4], wherein a lock protrusion (55) and a lock portion (24, 35) are provided on the body portion and the attachment portion; and
wherein the lock protrusion is locked in the lock portion to thereby assemble the body portion to the attachment portion.

What is claimed is:

1. A connector comprising:
a housing configured to be supported by a vehicle body panel; and
a terminal configured to be supported by the housing, and the terminal is configured to be electrically connected to a counterpart terminal of a counterpart connector when the counterpart connector is fitted to the connector,
wherein the housing comprises:
a body portion having an inner cylinder portion to which the terminal is assembled and to which a counterpart housing of the counterpart connector can be fitted; and
an attachment portion having an outer cylinder portion which is configured to be fixed to the vehicle body panel and to which the inner cylinder portion is fitted; and
wherein the body portion is assembled to the attachment portion in a state that the inner cylinder portion fitted to the outer cylinder portion penetrates the outer cylinder portion, and
wherein a substantially entire inner circumferential face of the outer cylinder portion contacts an outer circumferential face of the inner cylinder portion.

2. The connector according to claim 1, wherein each of the outer cylinder portion and the inner cylinder portion is formed into a circular cylinder shape; and
wherein a recess and a protrusion are provided on the inner circumferential face of the outer cylinder portion and the outer circumferential face of the inner cylinder portion so that the recess and the protrusion are engaged with each other to thereby regulate circumferential movement between the outer cylinder portion and the inner cylinder portion.

3. The connector according to claim 1, wherein a cap for opening or closing an opening portion of the inner cylinder portion is supported swingably on an edge portion of the outer cylinder portion; and
wherein a packing of the cap is brought into tight contact with whole circumference of a front end face of the inner cylinder portion in a state that the opening portion of the inner cylinder portion is closed by the cap.

4. The connector according to claim 1, wherein a lock protrusion and a lock portion are provided on the body portion and the attachment portion; and
wherein the lock protrusion is locked in the lock portion to thereby assemble the body portion to the attachment portion.

5. The connector according to claim 1, wherein a front end face of the inner cylinder portion is flush with a front end face of the outer cylinder portion.

6. The connector according to claim 1, wherein a positioning protrusion of the inner cylinder portion abuts against a fixation flange of the attachment portion.

7. The connector according to claim 1, wherein the body portion includes a set of lock protrusions, and the attachment portion includes a set of lock holes, and wherein the body portion is attached to the attachment portion via the set of lock protrusions and the set of lock holes.

8. The connector according to claim 1, wherein the body portion is attached to the attachment portion without a fastening screw.

9. The connector according to claim 1, wherein the attachment portion includes a set of insertion holes, and
wherein the attachment portion is attached to the vehicle body panel via a set of bolts that are screwed into a set of threaded holes of the vehicle body panel through the set of insertion holes.

10. The connector according to claim 1, wherein the attachment portion includes a set of stud bolts that are inserted into a set of hole portions of the vehicle body panel, and
wherein a set of nuts are fastened to the set of stud bolts from a back side of the vehicle body panel.

* * * * *